United States Patent [19]

Soda et al.

[11] Patent Number: 5,896,233
[45] Date of Patent: Apr. 20, 1999

[54] MARKING POSITION CORRECTING DEVICE FOR LASER MARKER

[75] Inventors: Akihiko Soda, Hiratsuka; Koji Misugi, Ninomiya-machi; Koji Yoshida, Hiratsuka, all of Japan

[73] Assignee: Komatsu Ltd., Tokyo, Japan

[21] Appl. No.: 08/913,342

[22] PCT Filed: Mar. 22, 1996

[86] PCT No.: PCT/JP96/00747

§ 371 Date: Sep. 11, 1997

§ 102(e) Date: Sep. 11, 1997

[87] PCT Pub. No.: WO96/29175

PCT Pub. Date: Sep. 26, 1996

[30] Foreign Application Priority Data

Mar. 22, 1995 [JP] Japan .................. 7-062861

[51] Int. Cl.$^6$ .............. G02B 27/14; G02B 26/08; B41B 15/00
[52] U.S. Cl. .............. 359/635; 359/202; 359/196; 395/103; 33/677
[58] Field of Search .............. 359/635, 202, 359/196; 395/103; 33/677

[56] References Cited

U.S. PATENT DOCUMENTS

| | | |
|---|---|---|
| 4,146,380 | 3/1979 | Caffarella .................. 65/105 |
| 5,309,273 | 5/1994 | Mori et al. .................. 359/202 |
| 5,430,665 | 7/1995 | Jin .................. 364/562 |
| 5,663,826 | 9/1997 | Tsuda .................. 359/202 |
| 5,801,868 | 9/1998 | Hayasaka .................. 359/202 |

FOREIGN PATENT DOCUMENTS

| | | |
|---|---|---|
| 4106210 | 8/1991 | Germany. |
| 60-46978 | 4/1985 | Japan. |
| 1-228688 | 9/1989 | Japan. |
| 03248744 | 6/1991 | Japan. |
| 4-39646 | 6/1992 | Japan. |

OTHER PUBLICATIONS

Supplementary European Search Report in EP 96 90 6919 mailed Jul. 20, 1998 (completed Jun. 15, 1998).
International Search Report in PCT/JP96/00747 mailed Jun. 18, 1996.

*Primary Examiner*—Georgia Epps
*Assistant Examiner*—Michael A. Lucas
*Attorney, Agent, or Firm*—Varndell Legal Group

[57] ABSTRACT

A low-cost high-speed device for correcting the marking position of a laser marker, which uses a smaller quantity of corrective data and a simplified arithmetic operations, wherein corrective values for design parameters for a lens are obtained on the basis of a production tolerance of the lens. The design parameters of the lens are corrected according to the corrective values, and the distance for the lens to move is calculated from the corrected design parameters of the lens and the distance to a desired marking position. A move command corresponding to the calculated distance is outputted to lens drive means, and a pattern of a divided image is marked in the desired position.

4 Claims, 7 Drawing Sheets

DIVERGENCE IN X DIRECTION dδ'x (μm)

| | | 1 | 2 | 3 | 4 | 5 | AVERAGE |
|---|---|---|---|---|---|---|---|
| | | -27 | -13.5 | 0 | 13.5 | 27 | |
| A | -27 | | | | | | |
| B | -13.5 | | | | | | |
| C | 0 | | | | | | |
| D | 13.5 | | | | | | |
| E | 27 | | | | | | |

FIG.7(b)

DIVERGENCE IN Y DIRECTION dδ'Y (μm)

| | | A | B | C | D | E | AVERAGE |
|---|---|---|---|---|---|---|---|
| | | -27 | -13.5 | 0 | 13.5 | 27 | |
| 1 | 27 | | | | | | |
| 2 | 13.5 | | | | | | |
| 3 | 0 | | | | | | |
| 4 | -13.5 | | | | | | |
| 5 | -27 | | | | | | |

MARKING POSITION CORRECTING DEVICE FOR LASER MARKER

TECHNICAL FIELD

The present invention relates to a device for correcting a marking position of a laser marker.

BACKGROUND ART

A device whereby a desired pattern is marked onto a specimen by irradiating the specimen with laser light is disclosed in Japanese Patent Publication 4-39646.

In the device disclosed in this patent, reference marks are provided at prescribed intervals in the X direction at the specimen stage, photodetector elements are provided, laser light is scanned in the X direction prior to actual marking, the divergence ΔX from the reference mark is determined for each reference mark from the timing at which light is received at each photodetector element, and the position of laser irradiation in the X direction is corrected for each reference mark on the basis of the divergence ΔX for each reference mark.

However, in the aforementioned device, since the position is corrected in reference mark units, a memory having a very large memory capacity is required in order to record and store data on the divergence, ΔX, for each reference mark, therefore leading to high costs. Furthermore, since it is necessary to read out and calculate computer data on the divergence, ΔX, for each reference mark, time is required for processing and high-speed processing cannot be achieved.

On the other hand, in a laser marker already implemented by the present applicant, although the composition of the device, which is premised on the use of a liquid crystal mask, or the like, differs from the prior art laser marker described above, there is a demand for correction of the marking position to be carried out at low cost and high speed.

The present invention was devised in view of the foregoing, its object being to provide a laser marker wherein the marking position can be corrected by means of a simple calculational process using a small quantity of corrective data, thereby enabling reductions in cost and increases in speed to be achieved.

DISCLOSURE OF THE INVENTION

The object of correcting the marking position by means of a simple calculational process using a small quantity of corrective data, thereby enabling reductions in cost and increases in speed to be realized, is achieved by a configuration that a marking position correction device for a laser marker which comprises: display means for dividing a marking pattern of an original image which is to be marked onto an object into marking patterns of divided images, and displaying the marking patterns of the divided images on a liquid crystal display screen; optical means for irradiating laser light generated by a laser light source onto the liquid crystal display screen and irradiating light which has permeated the liquid crystal display screen through a lens onto the object; lens moving means for moving the lens by a movement distance corresponding to a movement command signal, so as to mark the marking pattern of the divided image displayed on the liquid crystal display screen onto a position on the object corresponding to the movement distance; and control means for calculating the movement distance of the lens for marking the marking pattern of the divided image onto a desired position on the object corresponding to the divided image on the basis of a design parameter of the lens and the movement distance of the marking position up to the desired marking position, and outputting a movement command signal corresponding to the calculated lens movement distance to the lens moving means, characterized in that a corrective value for a design parameter of the lens is determined beforehand on the basis of a production tolerance of the lens and the lens movement distance is calculated on the basis of a design parameter of the lens corrected by the corrective value and the movement distance of the marking position up to the desired marking position, and by outputting a corrected movement command signal corresponding to the calculated lens movement distance to the lens moving means, the marking pattern of the divided image is marked onto the desired marking position.

Namely, in a lens marking device wherein the marking position on an object is changed by moving a lens, since the lens movement distance δ is determined according to a design parameter β of the lens and the movement distance δ' of the marking position up to the desired marking position, (for example, $\delta = \delta'/(1+\beta)$), a movement command signal corresponding to this lens movement distance δ should be supplied to the lens moving means.

In this way, it is clear that correction of divergence in the marking position can be achieved by correcting a design parameter β of the aforementioned lens using a production tolerance dβ determined uniformly for the lens used, regardless of the marking position.

Therefore, a corrective value $\alpha$ $(=(\beta+d\beta)/\beta)$ for the design parameter β of the aforementioned lens is determined beforehand. The design parameter β of the lens is corrected by the aforementioned corrective value $\alpha$ ($\alpha \cdot \beta$), the lens movement distance δ is calculated from this corrected design parameter ($\alpha \cdot \beta$) of the lens and the marking position movement distance β' up to the desired marking position, ($\delta = \delta'/(1'\alpha \cdot \beta)$), a movement command signal corresponding to this calculated lens movement distance δ is output to the aforementioned lens moving means, and a marking pattern of a divided image is marked onto a desired marking position.

In this way, the aforementioned corrective value $\alpha$ is a uniform data value based on a production tolerance, dβ, determined uniformly according to the lens used, and since the design parameter is corrected by a simple calculational process using only a uniform corrective value, $\alpha$, the marking position can be corrected at low cost and at high speed.

BEST MODE FOR CARRYING OUT THE INVENTION

Below, an embodiment of a laser marker relating to the present invention is described with reference to the drawings.

Figure 1:
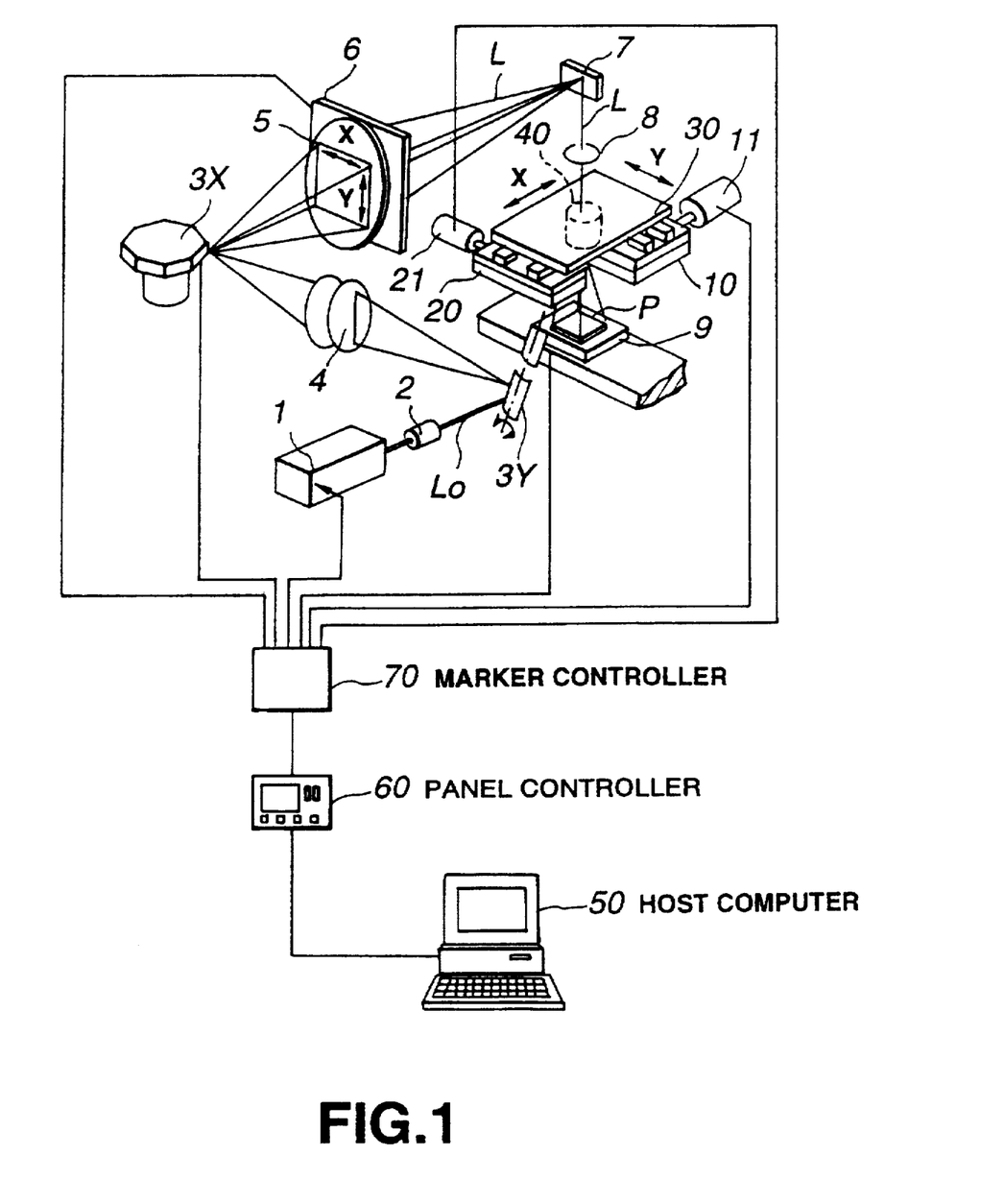
FIG. 1 shows the composition of an embodiment of a marking position correcting device for a laser marker relating to the present invention.

FIG. 1 is an oblique view showing the composition of a laser marker according to the embodiment. As FIG. 1 shows, this device comprises: a host computer 50 which inputs data relating to an original image to be marked onto the marking surface of a work 9 and creates original image data; a panel controller 60 which converts original image data output from the aforementioned host computer 50 to marking pattern data for a divided image of smaller blocks; a marker controller 70 which sends marking pattern data for a divided image output from the aforementioned panel controller 60 to a liquid crystal mask 6, and drives and controls a drive system of the laser marker; and a laser marking device (optics system and drive system) which directs laser light generated by a laser oscillator 1 onto the marking surface of the work 9.

The laser marking device in FIG. 1 conducts raster scanning of the laser light L0 over the display screen of a liquid crystal mask 6, and the laser light L transmitted thereby is deflected and directed onto the work 9 by means of a second XY deflector (hereinafter, called an "XY table" for the sake of convenience,) whereby the marking pattern displayed on the liquid crystal mask 6 is marked onto the work 9.

Namely, laser light L0 generated by the laser oscillator 1 passes through a beam splitter 2 and is caused to oscillate in the Y direction (vertical direction of the liquid crystal mask 6 in the diagram) by means of a galvanoscanner meter 3Y. Thereupon, the laser light L0 is condensed by a relay lens 4 and is caused to oscillate in the X direction (horizontal direction of the liquid crystal mask 6 in the diagram) by means of a polygon mirror 3X. The laser light L0 is then caused to converge on a reflecting mirror 7 by means of a lens 5.

Here, the laser light L0 is raster scanned over the divided pattern display screen on the liquid crystal mask 6 in response to the movement of the aforementioned galvanoscanner meter 3Y and polygon mirror 3X. The laser light L transmitted by the divided pattern display screen passes through an object lens 8 and enters the second XY deflector.

The marking pattern of the divided image on the liquid crystal mask 6 is deflected and directed by the second deflector onto a corresponding marking position.

Specifically, the second XY deflector comprises a first XY table 10, a second XY table 20, and a base 30 supported by these tables 10, 20 and having a lens 40.

The first XY table 10 is driven in the X direction by means of a drive motor 11, and the second XY table 20 is also driven in the X direction in accordance with the movement of this first XY table 10. Meanwhile, the second XY table 20 is driven in the Y direction by a drive motor 21 and the first XY table 10 is also driven in the Y direction in accordance with the movement of the second XY table 20.

The motors 11 and 21 are pulse motors, for example, and the irradiation point P on the marking surface of the work 9 is moved by a predetermined distance for each pulse.

In this way, the base 30 supported by these tables 10, 20 is moved to a desired position in the X and Y directions by means of these motors 11, 21 being driven.

Consequently, the lens 40 in the center of the base 30 is moved by an amount of lens movement, $\delta X$ and $\delta Y$, respectively, in the X and Y directions, and the laser light L transmitted by the lens 40 is moved by a movement distance $\delta' X$, $\delta' Y$ corresponding to the aforementioned amount of lens movement $\delta X$, $\delta Y$ over the XY plane of the work 9. Therefore, the laser light L is focused and directed onto a position P corresponding to the movement distances $\delta' X$, $\delta' Y$, and the marking pattern on the liquid crystal mask 6 is marked onto the position P.

Therebelow, similarly, marking patterns of a divided image (small block) 81 are successively marked onto the marking surface of a work 9 as indicated by the arrows, and finally a marking pattern of the entire original image 80 is marked onto a square region having sides 55 mm long. The size of the marking region may be 40×60 mm, 60×40 mm, 70×30 mm, 30×70 mm, and it can be set as desired.

In this process, the oscillation of the laser oscillator 1, the driving of the first XY deflector 3X, 3Y, the driving of the second XY deflector, the display switching of each divided pattern on the liquid crystal mask 6, and the like, are controlled by the marker controller 70.

As well as the original image data to be printed onto the marking surface of the work 9, the host computer 50 generates data for the coordinates position to be marked in μm units, and this data is transferred to the panel controller 60.

The panel controller 60 receives the aforementioned data and records it in a memory, and then records a code number indicating the original image transmitted from the host computer 50.

In the panel controller 60, the received original image data is converted to a marking pattern (data for liquid crystal display) for each divided image. Moreover, since the marking position data (data for the movement distance $\delta'$ up to the marking position) for the marking pattern of the divided image is in μm units, the panel controller 60 converts the unit of this data to a number of command pulses (in both the X direction and Y direction) for supply to the pulse motors 11, 21.

In the panel controller 60, the marking position movement distance $\delta'$ ($\delta' X$, $\delta' Y$) converted to the aforementioned unit is then converted to the aforementioned lens movement distance $\delta$ ($\delta X$, $\delta Y$). In other words, data for the lens movement distance $\delta$ (number of pulses corresponding to the size of movement distance) is obtained. In this way, data for the lens movement distance $\delta$ in the form of a number of pulses corresponding to the size of the movement distance is output to the marker controller 70, along with data for the printing pattern of the aforementioned divided image.

The marker controller 70 generates a pulse signal containing a number of pulses corresponding to the size of the movement distance on the basis of the data for the lens movement distance $\delta$, and it outputs this as a movement command signal to the motors 11, 21.

The marker controller 70 also converts the data for the marking pattern of a divided image (data for liquid crystal display) to an electrode supply signal for the electrodes of the liquid crystal 6, this electrode supply signal is fed to the liquid crystal mask 6, and a marking pattern is displayed on the liquid crystal mask 6.

The composition of the laser marker is not limited to that described above and it may be changed as appropriate.

For example, rather than scanning laser light over the liquid crystal mask 6, the whole surface of the liquid crystal mask 6 may be irradiated by laser light.

Next, the relationship between the lens movement distance δ of the aforementioned lens 40 and the focal point (marking position movement distance δ') is described with reference to FIG. 2.

Figure 2:
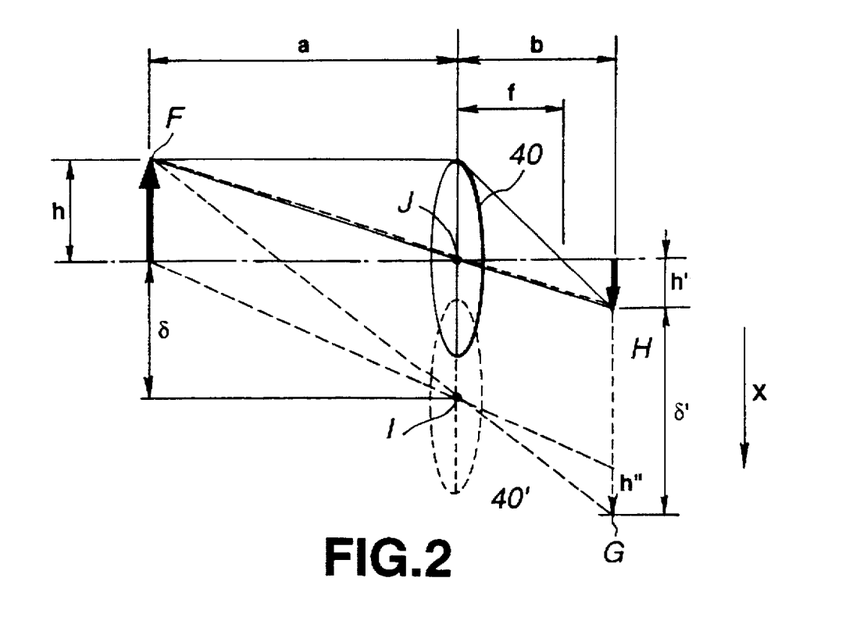
FIG. 2 is a diagram of geometric relationships describing the relationship between the movement distance of the lens according to the embodiment and the movement distance of the focal position.

FIG. 2 is a diagram for describing the geometrical relationship when the lens 40 is moved in a plane perpendicular to the paper surface (this is assumed to be plane X-Y in FIG. 1). The vertical direction of the paper surface is taken as the X axis.

In this case, an image in a position (point F) which is a distance a above lens 40 whose central point is J, and which is a distance h from the center of the lens 40 in the minus direction of the X axis, is formed by means of the lens 40 which is a convex lens at a position (point H) which is a distance b below the lens 40 and a distance h from the center of the lens 40 in the plus direction of the X axis.

The lens 40 is then moved by the movement distance 6 in the plus direction of the X axis, and the center of the lens is positioned at point L Thereby, the image is formed at a point G on the image formation surface which is shifted by the movement distance δ' in the plus direction of the X axis.

Here, the triangle FGH is similar to the triangle FIJ. Therefore, from this similarity relationship, the magnification β=h/h' of the lens 40 is expressed by $$\beta = b/a \quad (1)$$

Similarly, from the aforementioned similarity relationship, $$\delta : \delta' = a : (a+b)$$

and if this is rearranged as $$\delta' = \{(a+b)/a\}\delta = (1+b/a)\delta$$

and substituted into (1) above, the following relationship is obtained:

$$\delta' = (1+\beta)\cdot\delta \quad (2)$$

From this equation, it can be seen that the movement distance of the image formation position, namely, the marking position movement distance δ', is a magnification of (1+β) of the lens movement distance δ.

Next, the effect of production tolerance in the aforementioned lens magnification (difference between design value and measured value of product) on the divergence in the marking position is examined.

Namely, a small deviation in equation (2) above can be expressed by $$d\delta' = d\beta\cdot\delta + (1+\beta)\cdot d\delta \quad (3)$$

The first item on the right-hand side of equation (3) indicates that the tolerance dβ of the lens magnification factor has an effect on the divergence in marking position, and the second element on the right-hand side indicates that the lens locating precision dδ has an effect on the divergence in marking position.

Figure 3:
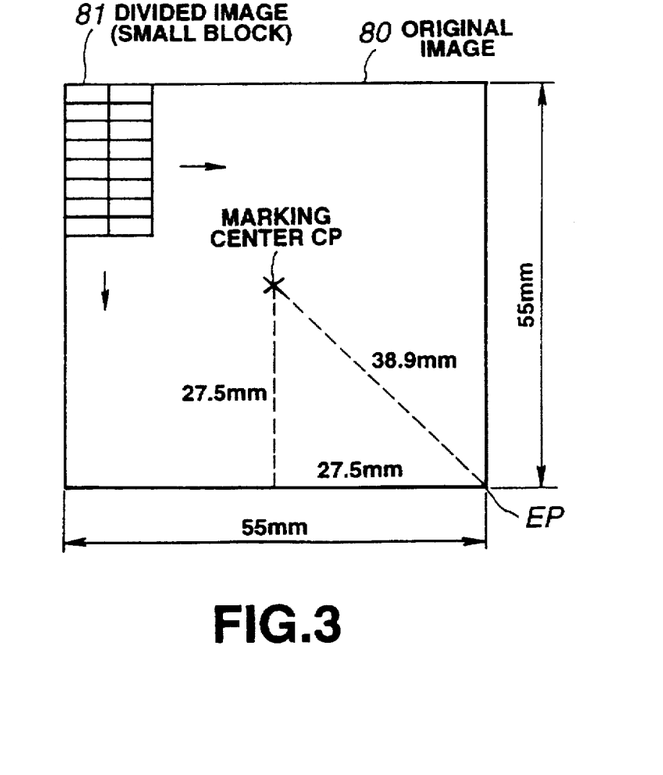
FIG. 3 shows an example of a marking region.

Here, as shown in FIG. 3, a case is supposed where a square region having sides 55 mm long is marked. The lens magnification factor β is 1.4, the tolerance of lens magnification factor dβ is ±0.01, and the lens locating precision dδ is ±5 μm.

Furthermore, if a value of δ'=38.9 mm for the movement distance from the marking center position CP to the marking region edge position EP, and a value of β=1.4 are substituted into a rearranged form of equation (2), namely, $$\delta = \delta'/(1+\beta)$$

then the lens movement distance δ will be 16.2 mm (16200 μm).

If the figures obtained in this way are substituted into equation (3), then the following values are obtained:

(3) The first item on the right-hand side (effect of tolerance dβ of lens magnification):

$$d\beta\cdot\delta = 162 \; \mu m$$

(3) The second item on the right-hand side (effect of tolerance dδ of lens locating precision):

$$(1+\beta)\cdot d\delta = 12 \; \mu m$$

and it can be seen that in the edge section of the marking region (for example, point EP,) where the lens movement distance is large, the tolerance dβ of lens magnification factor has a much greater effect compared to the lens locating precision dδ.

Therefore, as a result of this investigation, the second item on the right-hand side can be ignored and equation (3) above can be approximated to $$d\delta' = d\beta\cdot\delta \quad (4)$$

The tolerance dβ of lens magnification factor differs for each individual lens produced, and a uniform value for dβ is set for each lens. Therefore, it can be seen that, if the tolerance dβ is calculated beforehand for a lens as described below, then as demonstrated by equation (4), the divergence in the marking position dδ' can be corrected universally for a desired marking position.

Next, a method for determining the tolerance dβ of lens magnification factor is described.

Equation (4), dδ'=dβ·δ, indicates that there is a proportional relationship between the lens movement distance δ and the divergence in marking position dδ', and that the proportional constant is the tolerance dβ of lens magnification factor.

Figure 9:
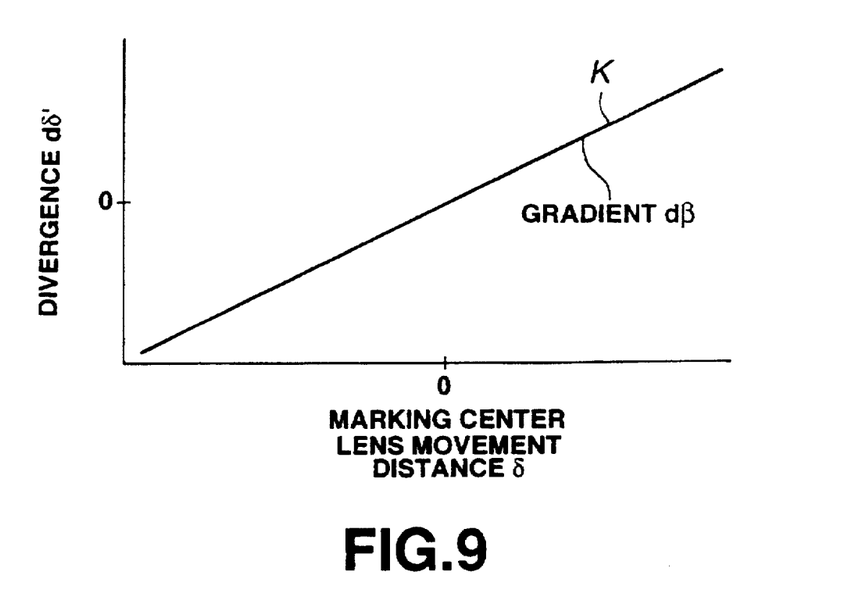
FIG. 9 is a graph showing the relationship between lens movement distance and divergence in marking position.

Therefore, a proportional relationship K as shown in FIG. 9 is determined by the minimum square rule, or the like, and the tolerance dβ of lens magnification factor is determined from the gradient of K. In FIG. 9, the origin O on the horizontal axis is the starting position which forms an origin for the movement distance δ, δ' (δ, δ'=0), and this is, for example, the marking center point CP in FIG. 3. Furthermore, the origin O on the vertical axis indicates a case where there is zero divergence between the desired marking position and the actual marking position.

Next, it is explained how the divergence in the marking position can be corrected by determining the aforementioned lens tolerance dβ and then using dβ to correct equation (2) describing the relationship between the lens movement distance δ and the marking position movement distance δ'.

Here, the designed value for the magnification factor of the lens 40 is taken as β, and the measured value for the magnification factor of the lens 40 when it is actually produced is taken as $\beta'$. In this case, taking the tolerance of magnification factor as $d\beta$, the relationship $$\beta'=\beta+d\beta \qquad (5)$$

is established. Therefore, a corrective constant formed by the ratio between the designed value for lens magnification and the actual measured value for lens magnification is defined as $$\alpha=\beta'/\beta \qquad (6)$$

If the lens 40 has a magnification factor of $\beta$ in accordance with its design value, then equation (2) becomes $$\delta=\delta'/(1+\beta) \qquad (7)$$

and therefore, if values for the marking position movement distance $\delta'$ (μm) corresponding to the desired marking position, and the design value for the lens magnification factor $\beta$ are substituted into this equation, then the lens movement distance $\delta$ (μm) can be calculated. Thereupon, a movement command signal containing a number of pulses for moving the lens 40 by this lens movement distance $\delta$ is generated (since the lens 40 moves through a prescribed unit distance for each pulse, the number of pulses is determined uniformly), and by outputting this movement command signal to the aforementioned pulse motors 11, 21, the laser marking position is moved to the desired marking position.

However, if the magnification factor $\beta$ of the lens 40 has a measured value $\beta'$ which diverges by a tolerance of $d\beta$ from the designed value, then by substituting $\beta'$ in place of $\beta$ in equation (2), the equation $$\delta=\delta'/(1+\beta') \qquad (8)$$

is obtained. If equation (6) is used here, then equation (8) will become equation (9) below:

$$\delta=\delta'/(1+\alpha\cdot\beta) \qquad (9)$$

Therefore, the lens movement distance $\delta$ (μm) can be calculated by substituting the marking position movement distance $\delta'$ (μm) corresponding to the desired marking position, the lens design value $\beta$, and the corrective coefficient $\alpha$ into equation (9). Thereupon, a movement command signal containing a number of pulses for moving the lens 40 by this lens movement distance $\delta$ is generated, and by outputting this signal to the aforementioned pulse motors 11, 21, the laser marking position can be corrected such that it moves to the desired marking position.

The corrective calculational processing using corrective coefficient $\alpha$ described in equation (9) is carried out by the panel controller 60.

Figure 4:
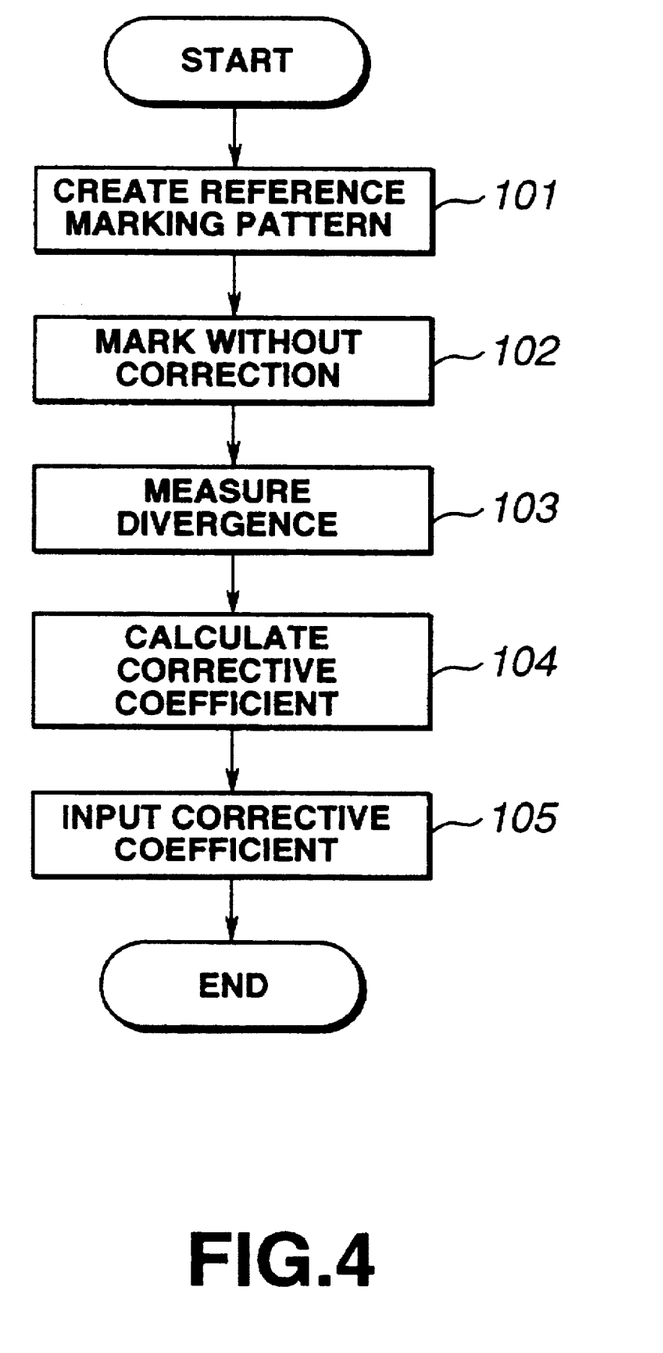
FIG. 4 is a flow-chart showing the process order according to the embodiment.

Next, corrective processing for the marking position including the aforementioned corrective calculational processing is described with reference to the flow-chart in FIG. 4.

Figure 5A:
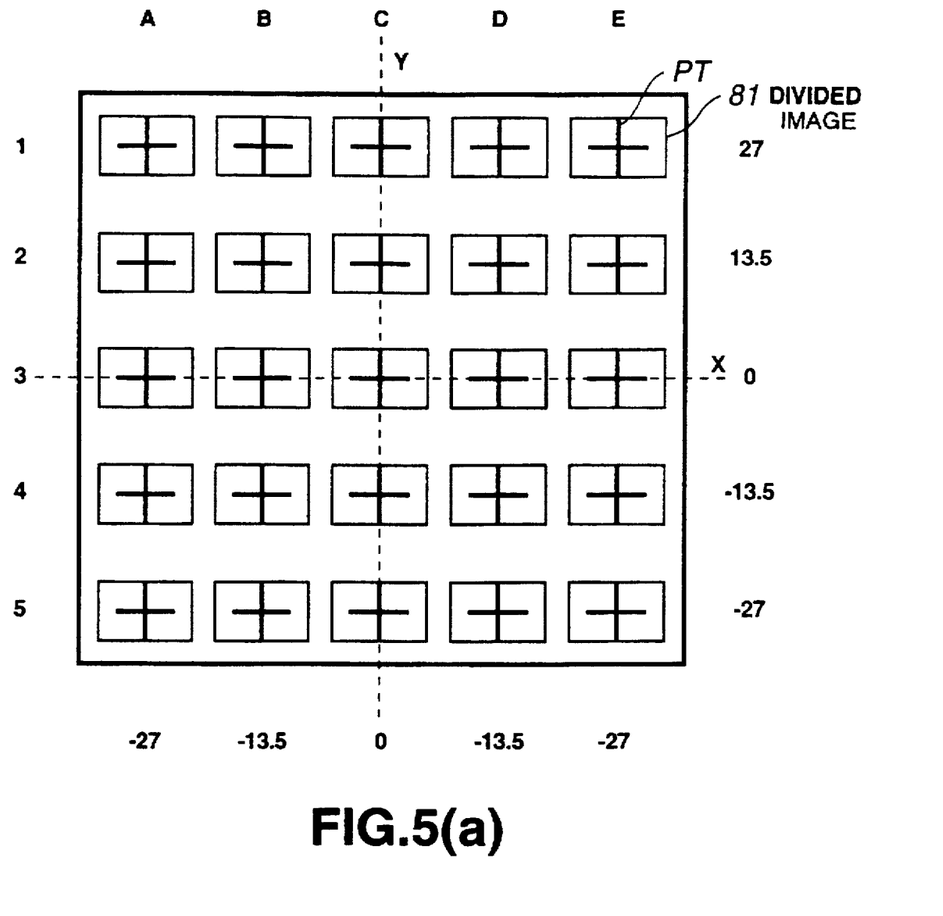
FIGS. 5(a) and 5(b) respectively show reference marking patterns in the embodiment.
Figure 5B:
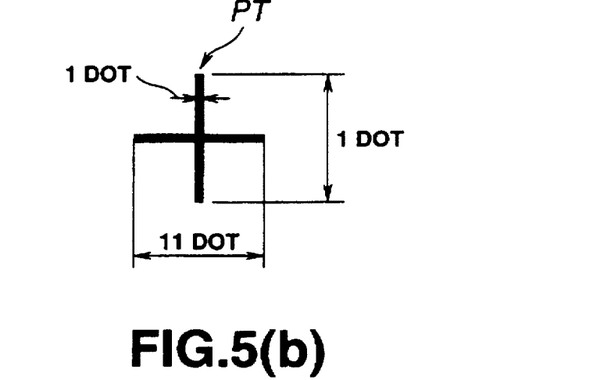

Firstly, the host computer 50 generates an original image containing a plurality of reference marking patterns PT as shown in FIG. 5(a). This original image of reference marking patterns PT is divided by the panel controller 60 into divided images 81 containing a single reference marking pattern. The marking positions for each reference marking pattern PT, A-1 (−27, 27), B-1 (−13.5, 27), . . . are set beforehand, and C-3 is taken as the point of origin (0,0). The reference marking pattern PT is constituted by dots as illustrated in FIG. 5(b) (step 101).

Next, the divided images 81 of the aforementioned marking pattern PT are successively marked, taking the corrective coefficient as $\alpha=1$, in other words, taking the lens magnification factor as being in accordance with the designed value.

The divided images 81 in FIG. 5(a) are displayed on the liquid crystal mask 6. Laser light L0 is generated by a laser oscillator 1 and the reference marking pattern transmitted by the liquid crystal mask 6 is marked onto the marking surface of a work 9 via a lens 40. During this, a movement command signal obtained on the basis of equation (7) is supplied to the pulse motors 11, 21 which drive the XY tables 10, 20, and the XY tables 10, 20 move in the X and Y directions.

Namely, a marking position movement distance $\delta'$ (μm) corresponding to a desired marking position for the divided image 81, and the lens magnification factor design value $\beta$, are substituted into equation (7), $\delta=\delta'/(1+\beta)$, a lens movement distance $\delta$ (μm) is calculated, a movement command signal containing a number of pulses for moving the lens 40 by this lens movement distance $\delta$ is generated, and this movement command signal is output to the aforementioned motors 11, 21.

Figure 6:
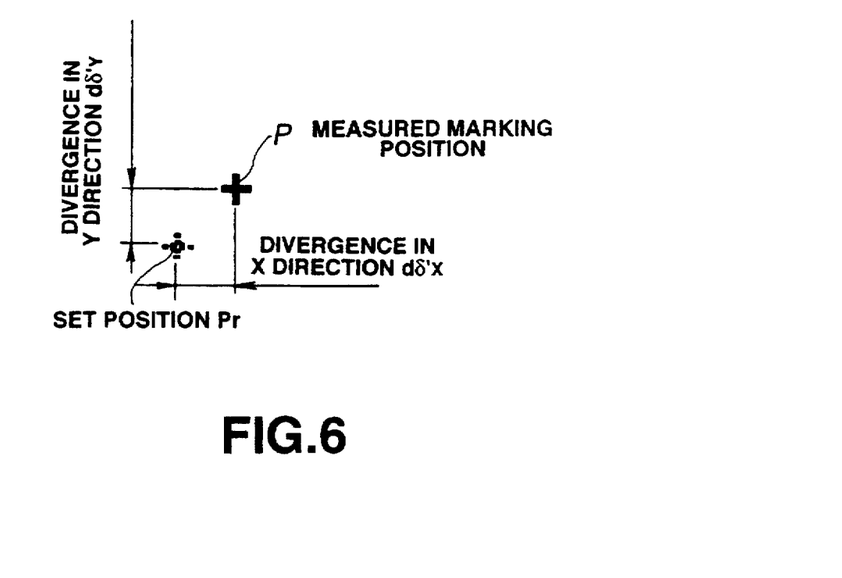
FIG. 6 shows the divergence between a set marking position and an actual marking position of a reference marking pattern.

Since the lens 40 has a tolerance $d\beta$, as shown in FIG. 6, the reference marking pattern PT is actually marked in a position P which diverges from the set marking position Pr (for example, point A-1) (step 102).

This divergence in the marking position $d\delta'$ is measured in both the X direction and Y direction.

Figures 7A, 7B:
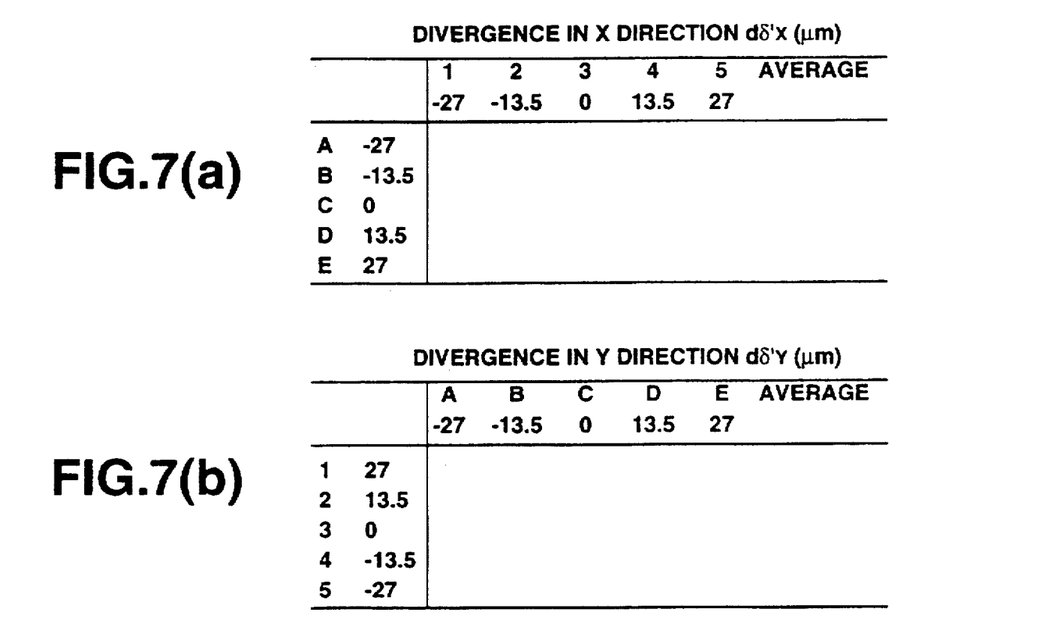
FIGS. 7(a) and 7(b) are tables showing measured values for divergence in marking position, in the X direction and Y direction.

Namely, the divergence in the marking position in the X direction, $d\delta'X$, is measured for each of the set marking positions A-1, A-2, . . . of the reference marking pattern PT, as shown in FIG. 7(a). The averages for points A, B, C, D, E are then found. Moreover, the divergence in the marking position in the Y direction, $d\delta'Y$, is measured for each of the set marking positions 1-A, 1-B, . . . of the reference marking pattern PT, as shown in FIG. 7(b). The averages for points 1, 2, 3, 4, 5 are then found (step 103).

Next, a similar relationship to that in FIG. 9 is determined for the X direction and Y direction on the basis of the divergence measurement data in FIGS. 7(a) and 7(b).

Figure 8A:
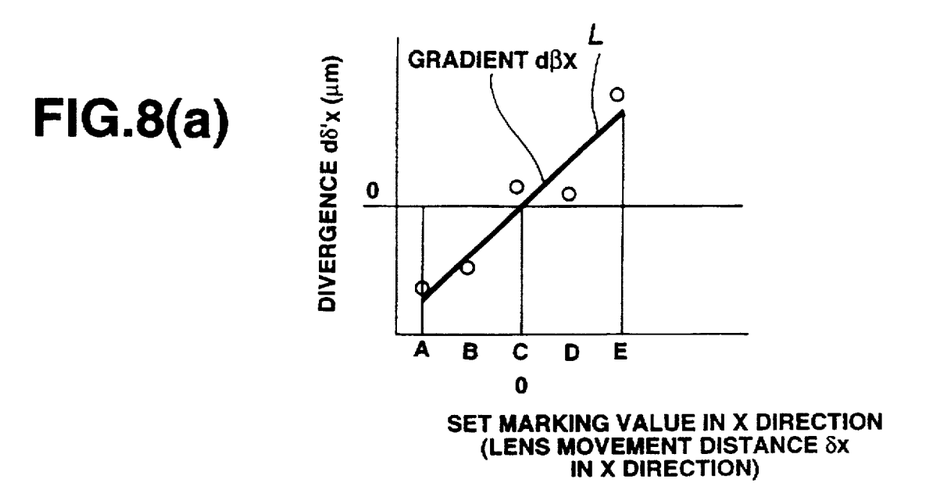
FIGS. 8(a) and 8(b) are graphs showing the relationship between lens movement distance and divergence in marking position, in the X direction and the Y direction.

Namely, as shown in FIG. 8(a), the average divergence $d\delta'X$ for each of the points A, B, C, D, E in FIG. 7(a) is plotted on the vertical axis with respect to the set marking values A, B, C, D, E in the X direction, and a proportional relationship L is derived by means of the minimum square rule. Here, the horizontal axis shows the lens movement distance in the X direction, $\delta X$. As a result, a relationship similar to that in FIG. 9 is obtained, and by applying equation (4), the lens magnification tolerance $d\beta X$ is derived from the proportional constant (gradient) of the proportional relationship L.

Figure 8B:
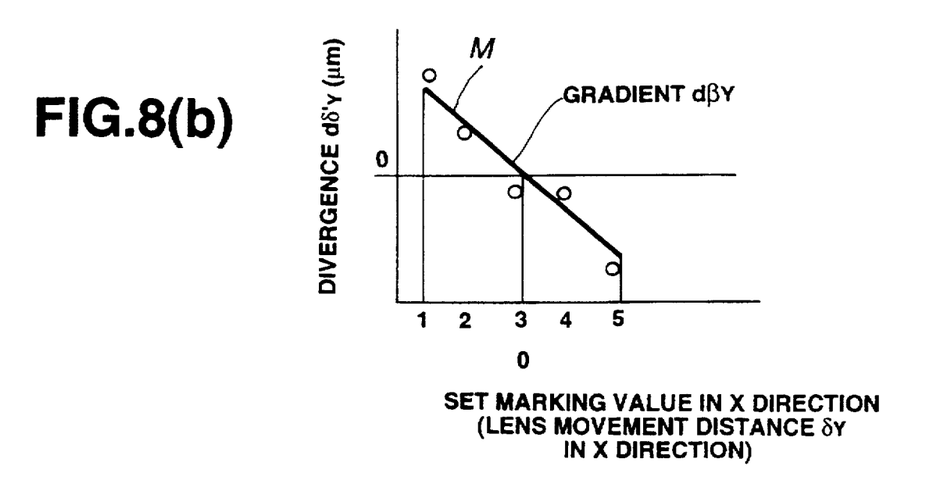

Similarly, as shown in FIG. 8(b), the average divergence $d\delta'Y$ for each of the points 1, 2, 3, 4, 5 in FIG. 7(b) are plotted on the vertical axis with respect to the set marking values in the Y direction, and a proportional relationship M is derived by means of the minimum square rule. Here, the horizontal axis shows the lens movement distance in the Y direction, $\delta Y$. As a result, a relationship similar to that in FIG. 9 is obtained, and by applying equation (4), the lens magnification tolerance $d\beta Y$ is derived from the proportional constant (gradient) of the proportional relationship M.

By determining the lens magnification tolerance $d\beta$ in this way, the corrective coefficient $\alpha$ can be derived from equation (5) and equation (6) (step 104).

Figure 10:
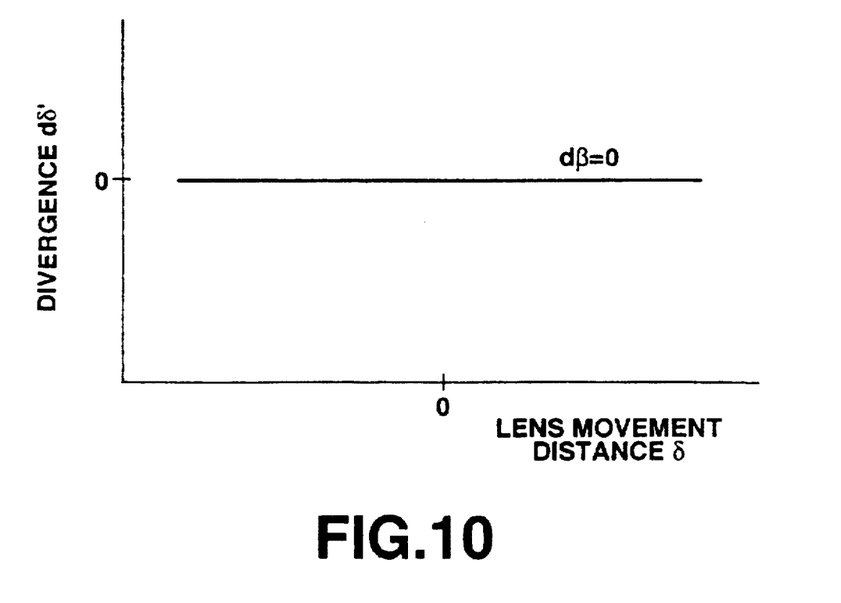
FIG. 10 is a graph showing the relationship between divergence in marking position and lens movement distance when the divergence in marking position has been corrected and the gradient is zero.

Next, the corrective coefficient a is substituted into equation (9) and the lens magnification factor is corrected by the degree of tolerance $d\beta$. Moreover, by substituting the marking position movement distance, $\delta'$ (μm), corresponding to the desired marking position, and the lens design value β, into equation (9), the lens movement distance δ (μm) is calculated. A movement command signal containing a number of pulses for moving the lens 40 by this calculated lens movement distance δ is generated and this signal is output to the aforementioned motor 11, 21. Consequently, a marking pattern of a divided image 81 is marked onto a desired marking position. If these results are represented as a relationship between the lens movement δ and the divergence in marking position dδ', then a relationship with a gradient of zero, in other words, where the lens magnification tolerance, dβ=0, is obtained as shown in FIG. 10, thus indicating that the divergence in marking position has become zero (step 105).

In this embodiment, the marking position was corrected on the basis of production tolerance in the magnification factor of the lens 40, but it may also be corrected by a similar method on the basis of production tolerance in design parameters other than the lens magnification factor.

As described above, according to the present invention, since correction of the marking position is conducted by means of a simple calculational process using a small quantity of corrective data, reductions in cost and increases in speed can be achieved.

We claim:

1. A marking position correction device for a laser marker which comprises: display means for dividing a marking pattern of an original image which is to be marked onto an object into marking patterns of divided images, and displaying the marking patterns of the divided images on a liquid crystal display screen; optical means for irradiating laser light generated by a laser light source onto the liquid crystal display screen and irradiating light which has permeated the liquid crystal display screen through a lens onto the object; lens moving means for moving the lens by a movement distance corresponding to a movement command signal, so as to mark the marking pattern of the divided image displayed on the liquid crystal display screen onto a position on the object corresponding to the movement distance; and control means for calculating the movement distance of the lens for marking the marking pattern of the divided image onto a desired position on the object corresponding to the divided image on the basis of a design parameter of the lens and the movement distance of the marking position up to the desired marking position, and outputting a movement command signal corresponding to the calculated lens movement distance to the lens moving means, characterized in that a corrective value for a design parameter of the lens is determined beforehand on the basis of a production tolerance of the lens and the lens movement distance is calculated on the basis of a design parameter of the lens corrected by the corrective value and the movement distance of the marking position up to the desired marking position, and by outputting a corrected movement command signal corresponding to the calculated lens movement distance to the lens moving means, the marking pattern of the divided image is marked onto the desired marking position.

2. The marking position correcting device for a laser marker according to claim 1, wherein the design parameter is a magnification factor of the lens, and the production tolerance is a tolerance of the magnification factor of the lens.

3. The marking position correcting device for a laser marker according to claim 1, wherein the production tolerance of the lens is determined using an equation $$d\delta' = d\beta \cdot \delta$$

where a divergence between the marking position before correction and the desired marking position after correction is taken as dδ', the production tolerance of the lens is taken as dβ, and the movement distance of the lens is taken as δ.

4. The marking position correcting device for a laser marker according to claim 1, wherein a proportional relationship of a divergence between an actual marking position and the desired marking position with respect to the movement distance of the lens is measured by moving the lens successively and actually marking a marking pattern of the divided image successively onto each position on the object, whereby the production tolerance of the lens can be determined beforehand on the basis of the proportional relationship.

* * * * *